(12) United States Patent
Seely et al.

(10) Patent No.: US 10,852,217 B2
(45) Date of Patent: Dec. 1, 2020

(54) METHODS AND SYSTEMS FOR DETERMINING CAUSES OF CONDITIONS IN COMPONENTS OF ROTARY MACHINES

(71) Applicant: General Electric Company, Schenectady, NY (US)

(72) Inventors: William Forrester Seely, Taylors, SC (US); Melissa Ann Seely, Taylors, SC (US)

(73) Assignee: General Electric Company, Schenectady, NY (US)

( * ) Notice: Subject to any disclaimer, the term of this patent is extended or adjusted under 35 U.S.C. 154(b) by 419 days.

(21) Appl. No.: 14/847,764

(22) Filed: Sep. 8, 2015

(65) Prior Publication Data

US 2017/0067799 A1 Mar. 9, 2017

(51) Int. Cl.
*G01M 99/00* (2011.01)
*F03D 17/00* (2016.01)

(52) U.S. Cl.
CPC ........... *G01M 99/007* (2013.01); *F03D 17/00* (2016.05)

(58) Field of Classification Search
CPC ..... G01M 99/007; Y02E 10/723; F03D 5/005
See application file for complete search history.

(56) References Cited

U.S. PATENT DOCUMENTS

| | | | |
|---|---|---|---|
| 4,803,639 A | 2/1989 | Steele et al. | |
| 6,185,511 B1 | 2/2001 | Steffan et al. | |
| 6,606,541 B2 | 8/2003 | Vaidyanathan | |
| 6,701,615 B2 | 3/2004 | Harding et al. | |
| 6,915,236 B2 | 7/2005 | Tanner et al. | |
| 8,792,705 B2 | 7/2014 | Scheid et al. | |
| 2004/0183900 A1 | 9/2004 | Karpen et al. | |
| 2009/0089020 A1* | 4/2009 | Boyer ................... | F01D 25/285 703/1 |
| 2010/0141756 A1 | 6/2010 | Grote et al. | |
| 2010/0280673 A1* | 11/2010 | Woste ................ | G05B 19/0428 700/287 |
| 2011/0270577 A1* | 11/2011 | Mihok .................... | F03D 7/048 702/188 |
| 2011/0298901 A1 | 12/2011 | Derrien et al. | |
| 2013/0114878 A1 | 5/2013 | Scheid et al. | |
| 2013/0119256 A1 | 5/2013 | Husmann et al. | |
| 2015/0168263 A1* | 6/2015 | Mueller ................ | F01D 21/003 348/82 |

* cited by examiner

*Primary Examiner* — Matthew G Marini
(74) *Attorney, Agent, or Firm* — Armstrong Teasdale LLP (57) ABSTRACT

A method for determining a potential cause of pre-identified conditions occurring in components of a plurality of rotary machines is provided. The method includes associating each rotary machine with a respective machine data set and identifying, in a component database, a first set of the components each having a first pre-identified condition. The method also includes identifying at least one common parameter from the machine data sets of the rotary machines associated with the first set of components, and identifying, in the component database, a second set of the components for which the machine data set of the associated rotary machine includes the at least one common parameter. The method further includes reporting the at least one common parameter as the potential cause of the first pre-identified condition, and as the potential cause of at least a second of the pre-identified conditions associated with the second set of components.

20 Claims, 4 Drawing Sheets

METHODS AND SYSTEMS FOR DETERMINING CAUSES OF CONDITIONS IN COMPONENTS OF ROTARY MACHINES

CROSS REFERENCE TO RELATED APPLICATIONS

Cross reference is hereby made to co-pending application Ser. No. TBD entitled "SYSTEM AND METHOD FOR IDENTIFYING A CONDITION OF ROTARY MACHINE COMPONENTS," filed on the same day and having the same inventors as the present application, the disclosure of which is hereby incorporated by reference in its entirety.

BACKGROUND

The field of the disclosure relates generally to rotary machines, and more particularly to determining a potential cause of previously identified conditions occurring in components of a plurality of rotary machines.

At least some known rotary machines include components, such as but not limited to rotor blades, that change condition over time due to, for example, wear and/or damage during operation of the rotary machine. In addition, at least some particular component conditions, such as a particular type and location of wear and/or damage, are at least sometimes associated with a corresponding operational profile of the rotary machine. In at least some cases, an ability to associate the operational profile with the particular component condition facilitates improving an operational procedure and/or design of the rotary machine to reduce or eliminate the particular type and location of wear and/or damage. However, identification of the operational profile associated with each particular component condition is limited by a complexity of comparing operational histories for a large number of different rotary machines, and by a difficulty in consistently categorizing operational histories of each of the rotary machines.

BRIEF DESCRIPTION

In one aspect, a method for determining a potential cause of pre-identified conditions occurring in components of a plurality of rotary machines is provided. The method includes associating each of the rotary machines with a respective machine data set and identifying, in a component database, a first set of the components each having a first of the pre-identified conditions. Each of the components is associated in the component database with one of the rotary machines and at least one of the pre-identified conditions. The method also includes identifying at least one common parameter from the machine data sets of the rotary machines associated with the first set of components, and identifying, in the component database, a second set of the components for which the machine data set of the associated rotary machine includes the at least one common parameter. The method further includes reporting the at least one common parameter as the potential cause of the first pre-identified condition, and as the potential cause of at least a second of the pre-identified conditions associated with the second set of components.

In another aspect, a computing system is provided. The computing system includes at least one processor communicatively coupled to at least one memory device. A component database is stored in the at least one memory device. Each of a plurality of components is associated in the component database with one of a plurality of rotary machines and at least one of a plurality of pre-identified conditions. The at least one processor is programmed to associate each of the rotary machines with a respective machine data set and identify, in the component database, a first set of the components each having a first of the pre-identified conditions. The at least one processor also is programmed to identify at least one common parameter from the machine data sets of the rotary machines associated with the first set of components, and to identify, in the component database, a second set of the components for which the machine data set of the associated rotary machine includes the at least one common parameter. The at least one processor further is programmed to report the at least one common parameter as a potential cause of the first pre-identified condition, and as a potential cause of at least a second of the pre-identified conditions associated with the second set of components.

In another aspect, at least one non-transitory computer-readable storage media is provided. The at least one computer-readable storage media has computer-executable instructions embodied thereon, which when executed by at least one processor, cause the at least one processor to associate each of a plurality of rotary machines with a respective machine data set and identify, from among a plurality of components each associated in a component database with one of the rotary machines and at least one of a plurality of pre-identified conditions, a first set of the components each having a first of the pre-identified conditions. The component database is stored in at least one memory device coupled to the at least one processor. The computer-executable instructions also cause the at least one processor to identify at least one common parameter from among machine data sets of the rotary machines associated with the first set of components, and to identify, in the component database, a second set of the components for which the machine data set of the associated rotary machine includes the at least one common parameter. The computer-executable instructions further cause the at least one processor to report the at least one common parameter as a potential cause of the first pre-identified condition, and as a potential cause of at least a second of the pre-identified conditions associated with the second set of components.

DETAILED DESCRIPTION

The exemplary systems and methods described herein overcome at least some of the disadvantages associated with known systems for determining causes of previously identified conditions, such as wear and/or damage, in components of rotary machines. The embodiments described herein provide identifying, in a component database, a first set of the components each having a first of the pre-identified conditions, and identifying at least one common parameter from operational and site histories of the rotary machines associated with the first set of components. The embodiments described herein also provide identifying, in the component database, a second set of the components for which the machine data set of the associated rotary machine includes the at least one common parameter, and reporting the at least one common parameter as the potential cause of the first pre-identified condition, and as the potential cause of at least a second of the pre-identified conditions associated with the second set of components.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
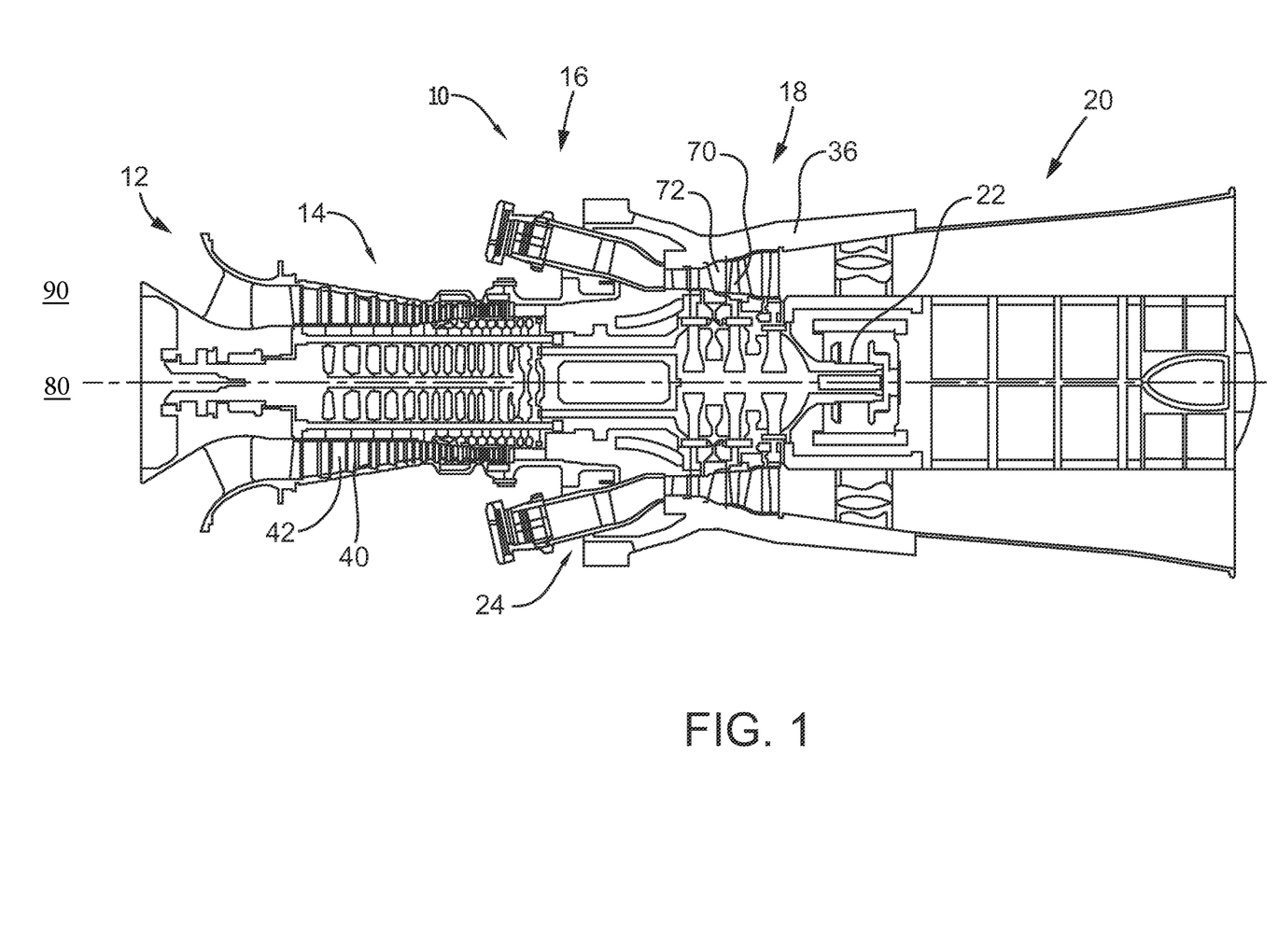
FIG. 1 is a schematic view of an exemplary rotary machine.

FIG. 1 is a schematic view of an exemplary rotary machine 10 having components for which embodiments of the imaging and analysis system of the current disclosure may be used. In the exemplary embodiment, rotary machine 10 is a gas turbine that includes an intake section 12, a compressor section 14 coupled downstream from intake section 12, a combustor section 16 coupled downstream from compressor section 14, a turbine section 18 coupled downstream from combustor section 16, and an exhaust section 20 coupled downstream from turbine section 18. A generally tubular casing 36 at least partially encloses one or more of intake section 12, compressor section 14, combustor section 16, turbine section 18, and exhaust section 20. In alternative embodiments, rotary machine 10 is any machine having components that enable the imaging and analysis system of the current disclosure to function as described herein.

In the exemplary embodiment, turbine section 18 is coupled to compressor section 14 via a rotor shaft 22. It should be noted that, as used herein, the term "couple" is not limited to a direct mechanical, electrical, and/or communication connection between components, but may also include an indirect mechanical, electrical, and/or communication connection between multiple components.

During operation of gas turbine 10, intake section 12 channels air towards compressor section 14. Compressor section 14 compresses the air to a higher pressure and temperature. More specifically, rotor shaft 22 imparts rotational energy to at least one circumferential row of compressor blades 40 coupled to rotor shaft 22 within compressor section 14. In the exemplary embodiment, each row of compressor blades 40 is preceded by a circumferential row of compressor stator vanes 42 extending radially inward from casing 36 that direct the air flow into compressor blades 40. The rotational energy of compressor blades 40 increases a pressure and temperature of the air. Compressor section 14 discharges the compressed air towards combustor section 16.

In combustor section 16, the compressed air is mixed with fuel and ignited to generate combustion gases that are channeled towards turbine section 18. More specifically, combustor section 16 includes at least one combustor 24, in which a fuel, for example, natural gas and/or fuel oil, is injected into the air flow, and the fuel-air mixture is ignited to generate high temperature combustion gases that are channeled towards turbine section 18.

Turbine section 18 converts the thermal energy from the combustion gas stream to mechanical rotational energy. More specifically, the combustion gases impart rotational energy to at least one circumferential row of rotor blades 70 coupled to rotor shaft 22 within turbine section 18. In the exemplary embodiment, each row of rotor blades 70 is preceded by a circumferential row of turbine stator vanes 72 extending radially inward from casing 36 that direct the combustion gases into rotor blades 70. The exhausted combustion gases flow downstream from turbine section 18 into exhaust section 20.

In certain embodiments, rotor shaft 22 is coupled to a load 80. In the exemplary embodiment, load 80 is an electrical generator coupled to a power grid 90. In alternative embodiments, load 80 is any other suitable load, such as, but not limited to, a mechanical drive application.

In some embodiments, a plurality of rotary machines 10 are associated with a given operating entity and/or manufacturer. Components of each rotary machine 10, such as, but not limited to, components of intake section 12, compressor section 14, combustor section 16, turbine section 18, and exhaust section 20 as listed above, are subject to wear and/or damage during operation of rotary machine 10. As just one example, rotor blades 70 and other components of rotary machine 10 in a hot gas path of rotary machine 10 are subject to wear and/or damage from exposure to the high temperature gases. As such, at least some components of rotary machines 10 are periodically examined to identify conditions such as wear and/or damage of the component.

Figure 2:
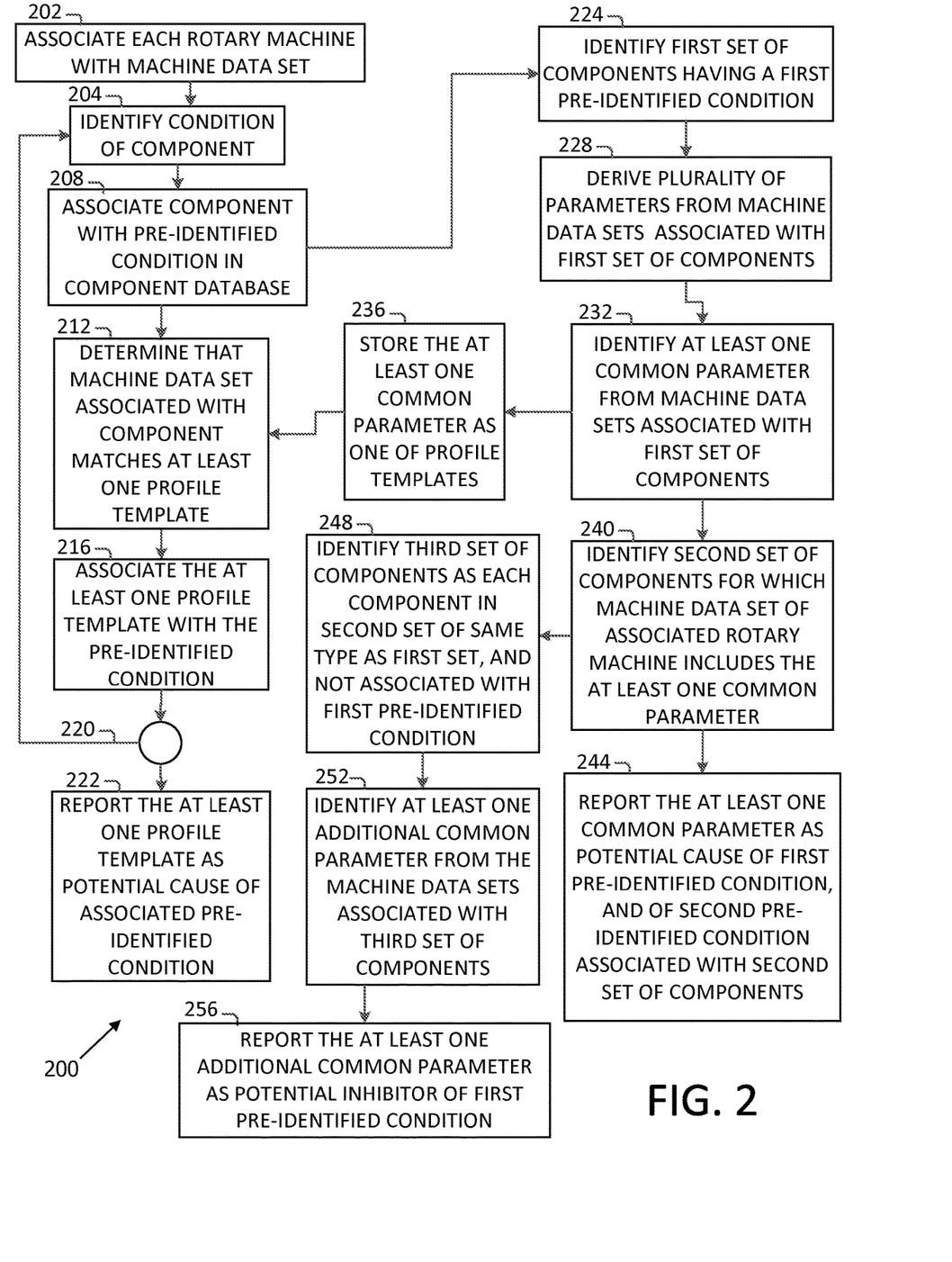
FIG. 2 is a flow diagram of an exemplary method for determining a potential cause of pre-identified conditions occurring in components of a plurality of rotary machines, such as the rotary machine shown in FIG. 1.

FIG. 2 is a flow diagram of an exemplary method 200 for determining a potential cause of pre-identified conditions occurring in components of a plurality of rotary machines 10 (shown in FIG. 1). With reference to FIGS. 1 and 2, in the exemplary embodiment, method 200 includes associating 202 each of the rotary machines with a respective machine data set 424 (shown schematically in FIG. 4). In certain embodiments, machine data set 424 for each rotary machine 10 includes recorded historical operational sensor and control data for the respective rotary machine 10, such as, but not limited to, a record of start-up events, operating duration and load after each startup, fuel pressure, fuel usage, and fuel/air ratio during operation, dynamic characteristics during operation, volatility of power grid 90 and/or other characteristics affecting load 80 during operation, number and type of alarm events, and similar data recorded during operation of each rotary machine 10. Moreover, in some embodiments, machine data set 424 for each rotary machine 10 includes site data for the respective rotary machine 10, such as, but not limited to, a geographic region in which the rotary machine is located, an altitude at which the rotary machine is located, a source of fuel for the rotary machine, a proximity of the rotary machine to a body of salt water, and a proximity of the rotary machine to a body of fresh water. Additionally or alternatively, machine data set 424 includes any other suitable data associated with the respective rotary machine 10.

In the exemplary embodiment, method 200 also includes identifying 204 at least one condition of a component of rotary machine 10. In certain embodiments, the step of identifying 204 the at least one condition includes identifying a selected type and location of wear and/or damage to the component. For example, but not by way of limitation, the component is rotor blade 70, the type of wear and/or damage is at least one of cracking, pitting, and erosion, and the location of wear and/or damage is at least one of an airfoil root, an airfoil midsection, an airfoil tip, an airfoil leading edge, an airfoil trailing edge, a suction side, a pressure side, a shroud plate, and a shroud rail of rotor blade 70. In some embodiments, an image and analysis system as described in the related patent application cross-referenced above, and incorporated herein by reference, is used to identify the condition of the component of rotary machine 10. In alternative embodiments, any suitable system and/or method is used to identify the condition of the component of rotary machine 10.

Figure 4:
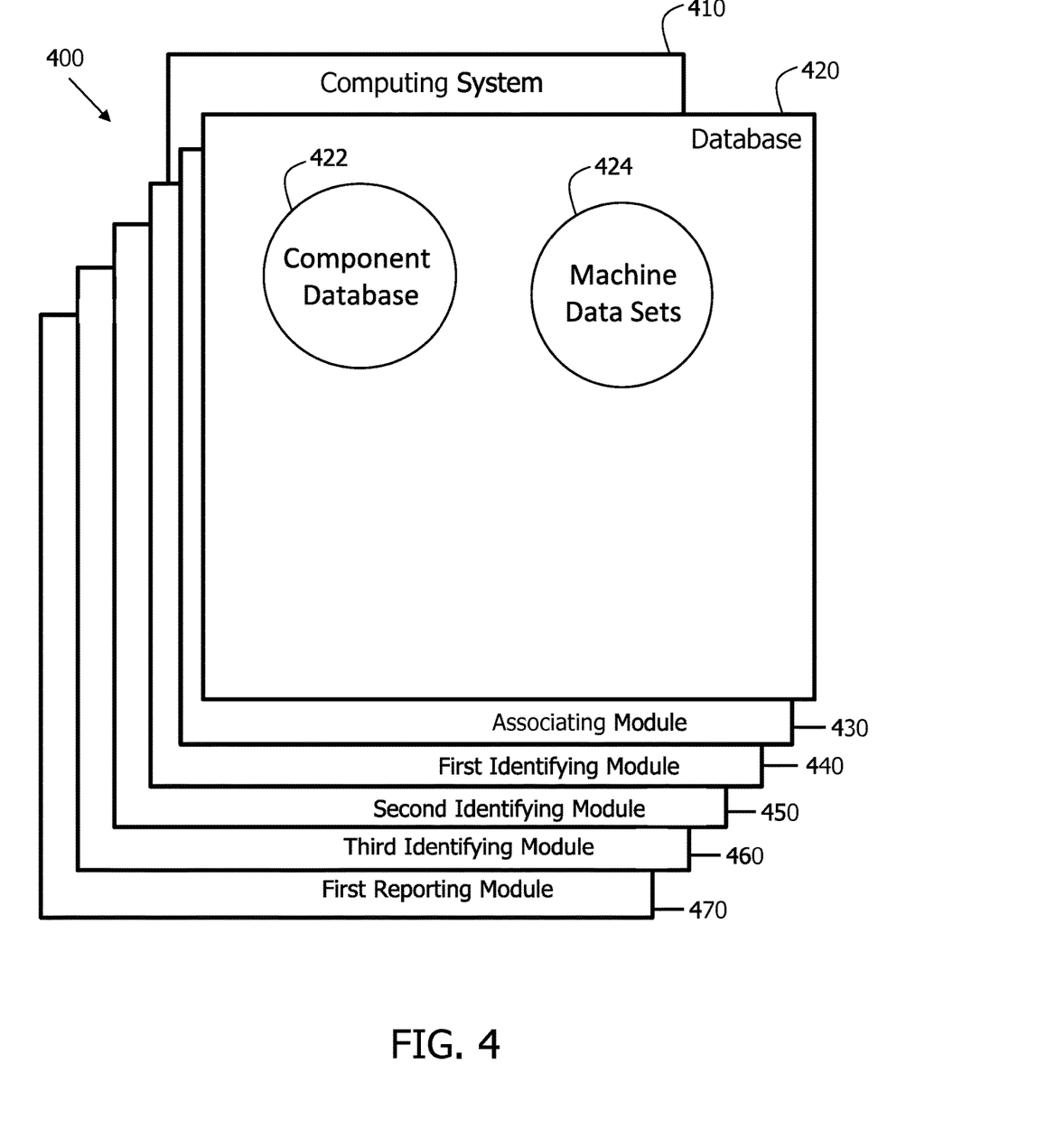
FIG. 4 is a schematic diagram of modules of an exemplary computing system that may be used to implement at least some of the steps of the exemplary method shown in FIG. 2.

In the exemplary embodiment, method 200 also includes associating 208 the component examined in step 204 with the at least one condition previously identified in step 204 in a component database 422 (shown schematically in FIG. 4). In certain embodiments, the step of associating 208 includes creating an entry for the examined component in component database 422. For example, but without limitation, no pre-existing entry in component database 422 includes a serial number of the examined component, necessitating a new entry. In other embodiments, the step of associating 208 includes updating an existing entry for the examined component in component database 422 to include the association with the at least one condition pre-identified in step 204.

Moreover, in certain embodiments, the step of associating 208 the component further includes associating the component in component database 422 with the one of rotary machines 10 to which the component was coupled when the component achieved the pre-identified condition. For example, but without limitation, the serial number of each component is associated in component database 422 or, alternatively, in a separate parts tracking database, with an identifier of the respective rotary machine 10 to which the component is coupled during a given time period.

In the exemplary embodiment, method 200 further includes determining 212 that machine data set 424 of the one of rotary machines 10 associated with the examined component matches at least one of a plurality of profile templates. The profile templates are stored in component database 422 or, alternatively, in a separate location. Each of the profile templates includes at least one parameter derivable from machine data set 424 that has been determined to be of interest in relation to determining causes of pre-identified conditions occurring in components of the plurality of rotary machines 10. One example process for determining such a profile template will be described in more detail herein.

In some embodiments, the step of determining 212 that machine data set 424 matches at least one profile template includes receiving at least a portion of machine data set 424 for the one of rotary machines 10 associated with the examined component from at least one historian database. For example, operational sensor and control data for each rotary machine 10 is recorded and/or stored in a respective historian database for later electronic retrieval. Additionally or alternatively, operational sensor and control data for each rotary machine 10 is recorded and/or stored in a central historian database for a plurality of rotary machines 10. In alternative embodiments, machine data set 424 is obtained in any suitable fashion.

In the exemplary embodiment, method 200 includes associating 216 the at least one profile template matched in step 212 with the at least one condition pre-identified in step 204. For example, but without limitation, the at least one profile template matched in step 212 is associated with the at least one pre-identified condition in component database 422 or, alternatively, in another suitable location.

In the exemplary embodiment, method 200 also includes repeating 220 steps 204, 208, 212, and 216 as necessary for additional components of plurality of rotary machines 10 that are determined to have wear and/or damage. As a result, in certain embodiments, a number of components associated with pre-identified conditions in component database 422 continues to increase. Also in the exemplary embodiment, method 200 includes reporting 222 the at least one profile template as the potential cause of the at least one pre-identified condition associated with the at least one profile template in step 216.

In some embodiments, as noted above, method 200 includes identifying additional profile templates that are of interest in relation to determining causes of pre-identified conditions occurring in components of the plurality of rotary machines 10. For example, in the exemplary embodiment, after a plurality of components have been associated in component database 422 with various pre-identified conditions in step 208, method 200 includes identifying 224, in component database 422, a first set of the components each having a first of the pre-identified conditions. For example, but not by way of limitation, each of the first set of components is one of rotor blades 70 from a first stage of turbine section 18 of one of rotary machines 10, and is associated in component database 422 with a surface erosion pattern on the pressure side of the airfoil that was pre-identified for each component in step 204.

Also in the exemplary embodiment, method 200 includes deriving 228 a plurality of parameters from machine data sets 424 of the rotary machines 10 associated with the first set of components. In some embodiments, the step of deriving 228 the plurality of parameters includes deriving at least a portion of the plurality of parameters from the historical operational data for each associated rotary machine 10. For example, but without limitation, the step of deriving 228 the plurality of parameters includes deriving, from each of machine data sets 424 of the rotary machines associated with the first set of components, at least one of a number of start-ups, a number of accelerated start-ups, a median time of day of start-ups, a median duration of continuous operation, a number of instances exceeding a threshold duration of continuous operation, a number of hours of base load operation, a number of hours of turndown operation, a number of hours of peak firing, a number of hours of operation above a dynamic amplitude threshold, a maximum temperature, a number of hours of operation with low fuel pressure, a number of hours of daytime operation, a number of hours of nighttime operation, a number of hours of operation during which the associated power grid 90 exceeded a volatility threshold, and a number and a type of alarm events, of rotary machine 10. In particular embodiments, the step of deriving 228 the plurality of parameters includes deriving at least one of the threshold-based parameters for each of a range of different threshold values, facilitating determination of a precise threshold level at which each type of wear and/or damage to components of rotary machine 10 becomes significant.

Additionally or alternatively, in certain embodiments, the step of deriving 228 the plurality of parameters includes deriving at least a portion of the plurality of parameters from the site data for each associated rotary machine 10. For example, but without limitation, the step of deriving 228 the plurality of parameters includes deriving, from each of machine data sets 424 of the rotary machines associated with the first set of components, at least one of a geographic region in which the rotary machine is located, an altitude at which the rotary machine is located, an ambient condition profile for the site of the rotary machine such as, but not limited to, a humidity profile, an owner/operator of the rotary machine, a source of fuel for the rotary machine, a proximity of the rotary machine to a body of salt water, a proximity of the rotary machine to a body of fresh water, and a proximity of the rotary machine to potential sources of air pollutants.

In the exemplary embodiment, method 200 includes identifying 232 at least one common parameter from machine data sets 424 of the rotary machines 10 associated with the first set of components. For example, the step of identifying 232 the at least one common parameter includes identifying the at least one common parameter from among the plurality of parameters for each of the rotary machines derived in step 228. In some cases, the at least one common parameter is determined to be a relatively simple factor, such as a maximum temperature above a selected threshold. In other cases, the at least one common parameter is determined to be a relatively complex combination of factors. For example, but not by way of limitation, the at least one common parameter is a combination of the owner/operator of the rotary machine, the number of accelerated start-ups, and an arid/desert site humidity profile.

In some embodiments, the step of identifying 232 the at least one common parameter further includes identifying each at least one common parameter as present in at least a threshold number of machine data sets 424 of the rotary machines associated with the first set of components. In certain embodiments, the threshold number of machine data sets 424 is defined as a percentage of a number of the rotary machines 10 associated with the first set of components. In alternative embodiments, the threshold number is defined as an absolute number of rotary machines 10 associated with the first set of components. In still other alternative embodiments, any suitable threshold criterion is used. In some embodiments, the threshold number is set relatively low to facilitate identifying a larger number of potential causes of the first pre-identified condition. Alternatively, in other embodiments, the threshold number is set relatively high to facilitate identifying potential causes of the first pre-identified condition that have a relatively stronger indication of causation. For example, but without limitation, a parameter common to a threshold number of 90 percent of the rotary machines 10 associated with the first set of components suggests a high likelihood of a causal relationship with the first pre-identified condition.

In some embodiments, method 200 also includes storing 236 the at least one common parameter as one of the plurality of profile templates for use in, for example, the step of determining 212 that machine data sets 424 of the rotary machines 10 associated with later-examined components match at least one of the plurality of profile templates.

In certain embodiments, after the at least one common parameter, also referred to as a new profile template of interest, is identified in step 232 through association with the first set of components, component database 422 is re-analyzed to identify other components having pre-identified conditions, other than the first pre-identified condition, that are potentially associated with the new profile template of interest. For example, in the exemplary embodiment, method 200 includes identifying 240, in component database 422, a second set of the components for which machine data set 424 of the associated rotary machine 10 includes the at least one common parameter. In some embodiments, at least some of the pre-identified conditions associated with the second set of components are pre-identified conditions other than the first pre-identified condition. Moreover, in certain embodiments, the second set of components are of a type that differs from a type of the first set of components. For example, but not by way of limitation, each of the first set of components is one of rotor blades 70 from a first stage of turbine section 18 of one of rotary machines 10, and each of the second set of components is one of turbine stator vanes 72 from a final stage of turbine section 18 of one of rotary machines 10. In alternative embodiments, at least one of the second set of components is of the same type as at least one of the first set of components.

Further in the exemplary embodiment, method 200 includes reporting 244 the at least one common parameter as the potential cause of the first pre-identified condition, and as the potential cause of at least a second of the pre-identified conditions associated with the second set of components. As stated above with respect to step 232, the at least one common parameter in some cases is determined to be a relatively simple factor, and in other cases is determined to be a relatively complex combination of factors. As also stated above with respect to step 228, in certain embodiments, each parameter is evaluated over a range of different threshold values to facilitate determination of a precise threshold level at which each type of wear and/or damage to components of rotary machine 10 becomes significant. Thus, method 200 enables automatic identification of a wide range of potential causes of damage patterns across plurality of rotary machines 10. For example, but not by way of limitation, the step of reporting 244 the at least one common parameter indicates that rotary machines 10 that experience more than a threshold number of accelerated start-ups have more damage to compressor blades 40 (shown in FIG. 2) relative to rotary machines 10 that experience only normal start-ups. For another example, but not by way of limitation, the step of reporting 244 the at least one common parameter indicates that rotary machines 10 that operate with combustion dynamics amplitudes above a particular threshold suffer from relatively frequent damage to first stage turbine blades 70 (shown in FIG. 2).

In certain embodiments, the step of reporting 244 the at least one common parameter as the potential cause of the at least second pre-identified condition includes identifying the at least second pre-identified condition as associated with at least a threshold number of the second set of components. In some embodiments, the threshold number of components is defined as a percentage of components associated with the at least second pre-identified condition in the second set of components. In alternative embodiments, the threshold number is defined as an absolute number of components associated with the at least second pre-identified condition in the second set of components. In still other alternative embodiments, any suitable threshold criterion is used. In certain embodiments, the threshold number is set relatively low to facilitate identifying a larger number of pre-identified conditions that are potentially caused by the new profile template of interest. Alternatively, in other embodiments, the threshold number is set relatively high to facilitate identifying pre-identified conditions that have a relatively stronger indication of causation by the new profile template of interest. For example, but without limitation, a second pre-identified condition associated with a threshold number of 50 percent of the components in the second set of components associated with rotary machines 10 having the at least one common parameter suggests a high likelihood of a causal relationship between the second pre-identified condition and the at least one common parameter.

In some embodiments, the step of identifying 240 the second set of the components for which machine data set 424 of the associated rotary machine 10 includes the at least one common parameter facilitates determining that the first and the at least second pre-identified conditions are substantially the same type and location of condition for the same types of component, but were inadvertently categorized separately in component database 422. Additionally or alternatively, the step of identifying 240 the second set of the components for which machine data set 424 of the associated rotary machine 10 includes the at least one common parameter facilitates determining that the first and the at least second pre-identified conditions are substantially different types and/or locations of conditions, and/or occur for different types of components, but are nevertheless linked to the same set of operating profiles and/or site conditions of rotary machines 10. In either case, method 200 facilitates developing an increased understanding of potential causes of conditions, such as wear and/or damage, of various components of rotary machines 10.

In the exemplary embodiment, method 200 further includes identifying 248 a third set of components that includes each component in the second set of components that is of a same type as the first set of components and is not associated with the first pre-identified condition in component database 422. Thus, the third set of components includes components that are of the same type, and exposed to the same profile template of interest, as components in the first set, yet did not exhibit the first pre-identified condition.

For example, but not by way of limitation, each of the first set of components is one of rotor blades 70 from a first stage of turbine section 18 of one of rotary machines 10, and is associated in component database 422 with a surface erosion pattern on the pressure side of the airfoil. The at least one common parameter in the profile template of the rotary machines associated with the first set of components includes a number of instances exceeding a threshold duration of continuous operation, and a proximity of the rotary machine 10 to a body of salt water. In this example, each of the third set of components also is one of rotor blades 70 from the first stage of turbine section 18 of one of rotary machines 10, and the associated rotary machines 10 also had the number of instances exceeding the threshold duration of continuous operation and the proximity to a body of salt water. However, the third set of components did not exhibit the surface erosion pattern on the pressure side of the airfoil.

In the exemplary embodiment, method 200 also includes identifying 252 at least one additional common parameter from machine data sets 424 of the rotary machines associated with the third set of components, and reporting 256 the at least one additional common parameter as a potential inhibitor of the first pre-identified condition. Thus, because the third set of components was exposed to a similar environment as the first set of components but did not exhibit the same resulting first pre-identified condition, method 200 facilitates identifying additional parameters in machine data sets 424 that potentially inhibit the first pre-identified condition from occurring.

Figure 3:
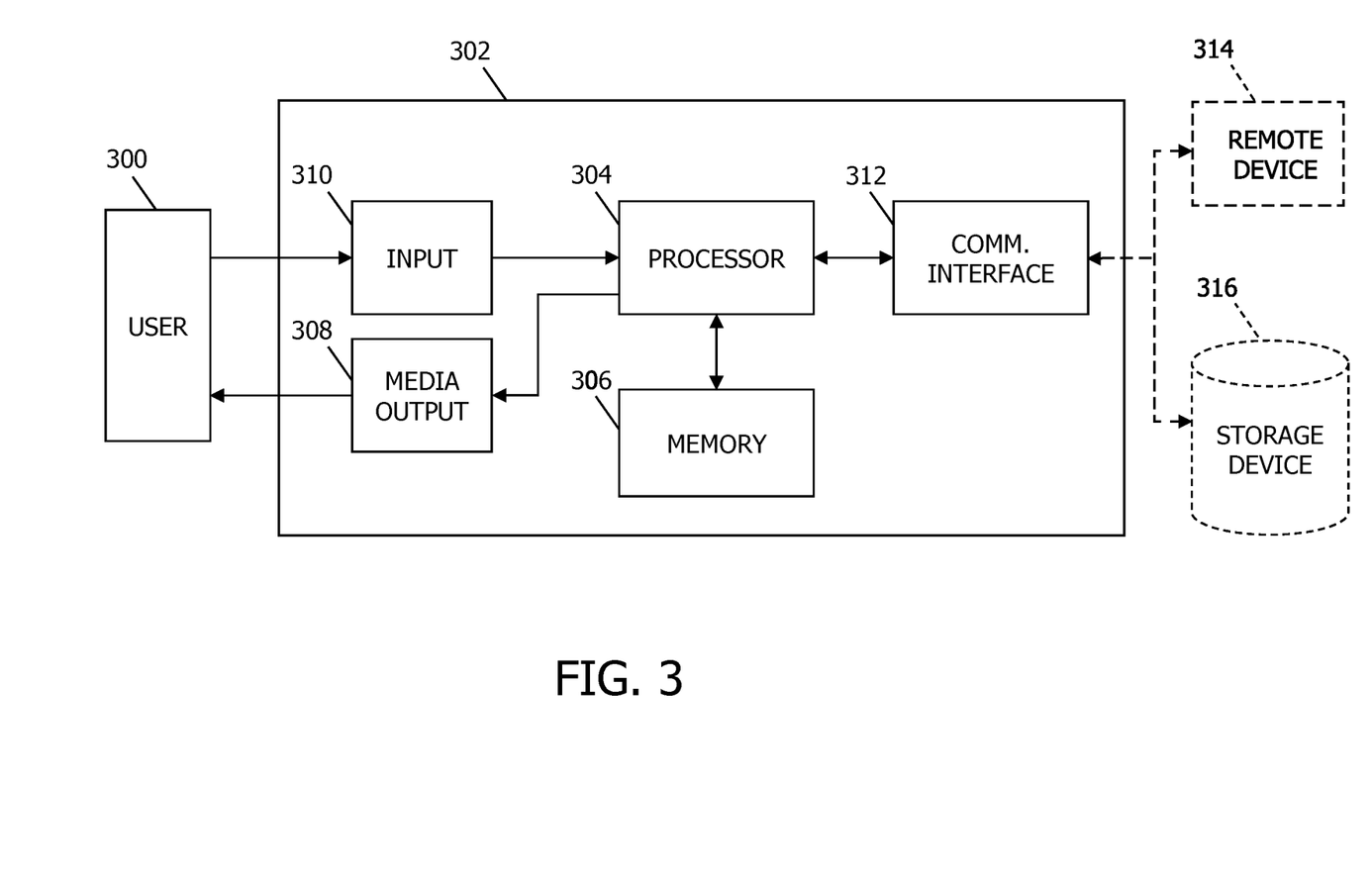
FIG. 3 is a block diagram of an exemplary computing device that may be used to implement at least some of the steps of the exemplary method shown in FIG. 2.

FIG. 3 is a block diagram of an exemplary computing device 302 that may be used to implement at least some of the steps of method 200 (shown in FIG. 2). For example, computing device 302 is operated by a user 300, either directly or indirectly via automation. In the exemplary embodiment, computing device 302 includes a processor 304 for executing instructions, such as, but not limited to, computer-executable instructions for implementing aspects of method 200. In some embodiments, processor 304 is transformed into a special-purpose microprocessor by executing computer-executable instructions or by otherwise being programmed. In certain embodiments, processor 304 includes one or more processing units (for example, in a multi-core configuration).

In the exemplary embodiment, executable instructions are stored in a memory device 306 coupled to processor 304. For example, memory device 306 is any suitable device that enables information such as executable instructions and/or input elements to be stored and retrieved. In some embodiments, memory device 306 includes one or more computer-readable media.

In the exemplary embodiment, computing device 302 also includes at least one media output component 308 for presenting information to user 300. For example, media output component 308 is any component capable of conveying information to user 300. In some embodiments, media output component 308 includes an output adapter (not shown), such as, but not limited to, a video adapter and/or an audio adapter. The output adapter is operatively coupled to processor 304 and operatively couplable to an output device, such as a display device (for example, a liquid crystal display (LCD), organic light emitting diode (OLED) display, or "electronic ink" display), a printer device, and/or an audio output device (e.g., a speaker or headphones). In some embodiments, media output component 308 is configured to present a graphical user interface (for example, a web browser and/or a client application) to user 300.

In some embodiments, computing device 302 includes an input device 310 for receiving input from user 300. User 300 may use input device 310 to, without limitation, select and/or enter a component of one of rotary machines 10 in component database 422, select and/or enter a first pre-identified condition for analysis, or access and/or edit profile template information. In certain embodiments, input device 310 includes at least one of a keyboard, a pointing device, a mouse, a stylus, a touch-sensitive panel (i.e., a touch pad or a touch screen), a gyroscope, an accelerometer, a position detector, and/or an audio input device. A single component, such as, but not limited to, a touch screen, may function as both an output device of media output component 308 and input device 310.

In the exemplary embodiment, computing device 302 also includes a communication interface 312. Communication interface 312 is configured to communicatively couple processor 304 to another device, such as, but not limited to, at least one remote computing device 314 and/or at least one remote storage device 316. For example, but not by way of limitation, communication interface 312 includes at least one of an Advanced Technology Attachment (ATA) adapter, a Serial ATA (SATA) adapter, a Small Computer System Interface (SCSI) adapter, a RAID controller, a SAN adapter, a wired or wireless network adapter, and a wireless data transceiver for use with a mobile phone network (e.g., Global System for Mobile communications (GSM), 3G) or other mobile data network (e.g., Worldwide Interoperability for Microwave Access (WIMAX)).

In certain embodiments, the at least one remote computing device 314 is used in combination with computing device 302 to implement at least some steps of method 200 (shown in FIG. 2). Each at least one remote computing device 314 has any suitable structure, such as, but not limited to, a structure similar to that of computing device 302. For example, but not by way of limitation, remote computing devices 314 are located at a plurality of repair shops for rotary machines 10, each remote computing device 314 is used to perform iterations of steps 204, 208, 212, and 216 of method 200, and a centrally located computing device 302 is used to perform steps 224, 228, 232, 236, 240, and 244. In alternative embodiments, remote device 314 is not used to perform any steps of method 200.

In some embodiments, the at least one storage device 316 is used in combination with computing device 302 to implement at least some steps of method 200 (shown in FIG. 2). Each at least one storage device 316 is any suitable computer-operated hardware for storing and/or retrieving data. For example, but not by way of limitation, each at least one storage device 316 electronically stores at least a portion of at least one of component database 422, machine data sets 424, the parts tracking database, and the historian databases, as described above. In certain embodiments, storage device 316 is integrated in at least one of computing device 302 and remote computing device 314. For example, but without limitation, computing device 302 includes one or more hard disk drives as storage device 316.

FIG. 4 is a schematic diagram 400 of modules of an exemplary computing system 410 that may be used to implement at least some of the steps of method 200 (shown in FIG. 2) in some embodiments. Each module of computing system 410 is programmed to perform specific tasks, as described below. In certain embodiments, computing system 410 is implemented on at least one computing device 302 and/or remote computing device 314 (shown in FIG. 3). In the exemplary embodiment, at least one database 420 is coupled to several other modules within computing system 410. In some embodiments, database 420 is implemented using the at least one storage device 316 (shown in FIG. 3).

In the exemplary embodiment, the at least one database 420 is configured to store component database 422 and machine data sets 424. Component database 422 includes at least, for each of a plurality of components of rotary machines 10, an identifier of the component, at least one pre-identified condition associated with the component, and an identifier of the one of rotary machines 10 to which the component was coupled when the component achieved the associated pre-identified condition. Machine data sets 424 include, for example, historical operations data and site data, as described above, for each of the rotary machines 10 associated with the plurality of components.

In the exemplary embodiment, computing system 410 includes an associating module 430. Associating module 430 is configured to associate each of a plurality of rotary machines with a respective machine data set 424. Also in the exemplary embodiment, computing system 410 includes a first identifying module 440. First identifying module 440 is configured to identify, in component database 422, the first set of the components each having a first of the pre-identified conditions. Also in the exemplary embodiment, computing system 410 includes a second identifying module 450. Second identifying module 450 is configured to identify at least one common parameter from machine data sets 424 of the rotary machines 10 associated with the first set of components. For example, but not by way of limitation, second identifying module 450 receives data from a module (not shown) configured to derive a plurality of parameters from machine data sets 424 of the rotary machines 10 associated with the first set of components, and identifies the at least one common parameter from among the derived plurality of parameters for each of the rotary machines.

Further in the exemplary embodiment, computing system 410 includes a third identifying module 460. Third identifying module 460 is configured to identify, in the component database, a second set of the components for which machine data set 424 of the associated rotary machine includes the at least one common parameter. Additionally in the exemplary embodiment, computing system 410 includes a first reporting module 470. First reporting module 470 is configured to report the at least one common parameter as the potential cause of the first pre-identified condition and at least a second of the pre-identified conditions associated with the second set of components.

In certain embodiments, computing system 410 also includes additional modules that implement, for example, but not by way of limitation, at least some of the additional steps of method 200 as described above. In some embodiments, the modules of computing system 410 are distributed among a plurality of computing devices, as described above.

In certain embodiments, modules of computing system 410 are at least partially implemented using computer programming or engineering techniques including computer software, firmware, hardware, or any combination or subset thereof. More specifically, such embodiments having computer-readable code means are embodied within one or more computer-readable media, thereby making a computer program product. For example, but not by way of limitation, the computer-readable media is at least one of a fixed (hard) drive, diskette, optical disk, magnetic tape, semiconductor memory such as read-only memory (ROM), and/or any transmitting/receiving medium such as the Internet or other communication network or link. An article of manufacture containing the computer code is made and/or used by, for example, executing the code directly from one medium, by copying the code from one medium to another medium, and/or by transmitting the code over a network.

These computer programs (also known as software, software applications, "apps," or code) include machine instructions for a programmable processor, such as processor 304, and can be implemented in a high-level procedural and/or object-oriented programming language, and/or in assembly/machine language. As used herein, the term "computer-readable medium" refers to any computer program product, apparatus, and/or device (for example, magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, the term "processor" includes any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

Exemplary embodiments of methods and systems for determining causes of previously identified conditions, such as wear and/or damage, in components of a plurality of rotary machines are described above in detail. The exemplary methods and systems described herein provide an advantage in facilitating automated identification of operating parameters of rotary machines that cause certain components to have similar previously identified wear and/or damage patterns. Moreover, the exemplary methods and systems described herein provide an advantage in facilitating automated identification of other previously identified conditions, in some cases for other types of components, that also are caused by the same operating parameters. In certain embodiments, the exemplary methods and systems described herein also provide an advantage in facilitating identification of operating parameters that inhibit certain previously identified component conditions. A technical effect of the exemplary systems and methods described herein includes at least (i) identifying a first set of the components each having a first of the pre-identified conditions, (ii) identifying at least one common parameter from the machine data sets of the rotary machines associated with the first set of components, (iii) identifying a second set of the components for which the machine data set of the associated rotary machine includes the at least one common parameter, and (iv) reporting the at least one common parameter as the potential cause of the first pre-identified condition, and as the potential cause of at least a second of the pre-identified conditions associated with the second set of components.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

While the disclosure has been described in terms of various specific embodiments, those skilled in the art will recognize that the disclosure can be practiced with modification within the spirit and scope of the claims. Although specific features of various embodiments of the disclosure may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

What is claimed is:

1. A method of determining a potential cause of pre-identified conditions occurring in components of a plurality of rotary machines, said method comprising:
   receiving, for each of the rotary machines, a respective machine data set including recorded historical operational sensor and control data, a characteristic recorded during operation of the rotary machine that affects power transmitted to at least one of an electrical generator and a mechanical drive providing a load on the rotary machine, and geographical site data for the associated rotary machine;
   removing at least some of the components from a respective rotary machine of the plurality of rotary machines;
   determining, for each of the removed components via image data of the components obtained after removal of the components from the rotary machines, at least one of the pre-identified conditions, wherein each of the pre-identified conditions includes a location and component wear or damage including at least one of cracking, pitting, and erosion, and wherein the location includes at least one of an airfoil root, an airfoil midsection, an airfoil tip, an airfoil leading edge, an airfoil trailing edge, a suction side, a pressure side, a shroud plate, and a shroud rail;
   associating, in a component database, each of the components with the corresponding identified at least one pre-identified condition and the respective one of the rotary machines from which the component was removed;
   identifying, in the component database, a first set of the components each having a first of the pre-identified conditions;
   identifying at least one common parameter from the machine data sets of the rotary machines associated with the first set of the components, wherein the at least one common parameter is at least one of the characteristic recorded during operation of the rotary machine that affects power transmitted to at least one of an electrical generator and a mechanical drive, and the geographical site data of the rotary machines;
   storing, in a memory device, the at least one common parameter as a new profile template of a plurality of profile templates, the profile templates each including at least one parameter derivable from the machine data set that has been determined to be of interest in relation to determining causes of pre-identified conditions occurring in components of the plurality of rotary machines;
   identifying at least one of the rotary machines having a respective machine data set matching the new profile template;
   identifying, in the component database, a second set of the components associated with the at least one rotary machine, wherein a second of the pre-identified conditions is common to each of the components of the second set of the components; and
   reporting the at least one common parameter as the potential cause of the first pre-identified condition, and as the potential cause of the second pre-identified condition associated with the second set of the components.

2. The method of claim 1, wherein each of the machine data sets includes historical operational data for the associated rotary machine, said identifying at least one common parameter comprises deriving, from each of the machine data sets of the rotary machines associated with the first set of the components, at least one of a number of rotary machine start-ups, a number of accelerated rotary machine start-ups, a median time of day of rotary machine start-ups, a median duration of continuous operation of the rotary machine, a number of instances exceeding a threshold duration of continuous operation of the rotary machine, a number of hours of base load operation of the rotary machine, a number of hours of turndown operation of the rotary machine, a number of hours of peak firing of the rotary machine, a number of hours of operation of the rotary machine above a dynamic amplitude threshold, a maximum temperature of the rotary machine, a number of hours of operation of the rotary machine with low fuel pressure, a number of hours of daytime operation of the rotary machine, a number of hours of nighttime operation of the rotary machine, a number of hours of operation of the rotary machine during which an associated power grid exceeds a volatility threshold, and a number and a type of alarm events of the rotary machine.

3. The method of claim 1, wherein said identifying at least one parameter comprises deriving, from each of the machine data sets of the rotary machines associated with the first set of the components, at least one of a geographic region in which the rotary machine is located, an altitude at which the rotary machine is located, an ambient condition profile for the site of the rotary machine, an owner/operator of the rotary machine, a source of fuel for the rotary machine, a proximity of the rotary machine to a body of salt water, a proximity of the rotary machine to a body of fresh water, and a proximity of the rotary machine to potential sources of air pollutants.

4. The method of claim 1, wherein said identifying at least one common parameter comprises identifying each at least one common parameter as present in at least a threshold number of the machine data sets of the rotary machines associated with the first set of the components.

5. The method of claim 1, wherein said reporting the at least one common parameter as the potential cause of the second pre-identified condition comprises identifying the second pre-identified condition as associated with at least a threshold number of the second set of components.

6. The method of claim 1, further comprising storing the at least one common parameter as one of a plurality of profile templates.

7. The method of claim 6, further comprising:
associating an examined component with at least one of the pre-identified conditions in the component database;
determining that the machine data set of the one of the rotary machines associated with the examined component matches at least one of the plurality of profile templates; and
reporting the at least one matched profile template as the potential cause of the at least one pre-identified condition.

8. The method of claim 1, further comprising:
identifying, in the component database, a third set of components that includes each component in the second set of components that is of a same type as components of the first set of the components and is not associated with the first pre-identified condition in the component database;
identifying, in the component database, at least one additional common parameter from the machine data sets of the rotary machines associated with the third set of components; and
reporting the at least one additional common parameter as a potential inhibitor of the first pre-identified condition.

9. An imaging and analysis computing system comprising at least one processor communicatively coupled to at least one memory device, wherein a component database is stored in the at least one memory device, wherein each of a plurality of components is associated in the component database with one of a plurality of rotary machines and at least one of a plurality of pre-identified conditions, and wherein the at least one processor is programmed to:
receive, for each of the rotary machines, a respective machine data set including recorded historical operational sensor and control data for the associated rotary machine, a characteristic recorded during operation of the rotary machine that affects power transmitted to at least one of an electrical generator and a mechanical drive, and geographical site data for the associated rotary machine;
receive an indication of a removal of at least some of the components from a respective rotary machine of the plurality of rotary machines;
determine, for each of the removed components via image data of the components obtained after removal of the components from the rotary machines, at least one of the pre-identified conditions, wherein each of the pre-identified conditions includes a location and component wear or damage including at least one of cracking, pitting, and erosion, and wherein the location includes at least one of an airfoil root, an airfoil midsection, an airfoil tip, an airfoil leading edge, an airfoil trailing edge, a suction side, a pressure side, a shroud plate, and a shroud rail;
associate, in the component database, each of the components with the corresponding identified at least one pre-identified condition and the respective one of the rotary machines from which the component was removed;
identify, in the component database, a first set of the components each having a first of the pre-identified conditions;
identify at least one common parameter from the machine data sets of the rotary machines associated with the first set of the components, wherein the at least one common parameter is at least one of the characteristic affecting load recorded during operation of the rotary machine, and the geographical site data of the rotary machines;
store the at least one common parameter as a new profile template of a plurality of profile templates, the profile templates each including at least one parameter derivable from the machine data set that has been determined to be of interest in relation to determining causes of pre-identified conditions occurring in components of the plurality of rotary machines;
identify at least one of the rotary machines having a respective machine data set matching the new profile template;
identify, in the component database, a second set of the components associated with the at least one rotary machine, wherein a second of the pre-identified conditions is common to each of the components of the second set of the components; and
report the at least one common parameter as a potential cause of the first pre- identified condition, and as a potential cause of the second pre-identified condition associated with the second set of components.

10. The imaging and analysis computing system of claim 9, wherein the at least one processor is further programmed to derive, from each of the machine data sets of the rotary machines associated with the first set of the components, at least one of a number of rotary machine start-ups, a number of accelerated rotary machine start-ups, a median time of day of rotary machine start-ups, a median duration of continuous operation of the rotary machine, a number of instances exceeding a threshold duration of continuous operation of the rotary machine, a number of hours of base load operation of the rotary machine, a number of hours of turndown operation of the rotary machine, a number of hours of peak firing of the rotary machine, a number of hours of operation of the rotary machine above a dynamic amplitude threshold, a maximum temperature of the rotary machine, a number of hours of operation of the rotary machine with low fuel pressure, a number of hours of daytime operation of the rotary machine, a number of hours of nighttime operation of the rotary machine, a number of hours of operation of the rotary machine during which an associated power grid exceeds a volatility threshold, and a number and a type of alarm events of the rotary machine.

11. The imaging and analysis computing system of claim 9, wherein each of the machine data sets includes geographical site data for the associated rotary machine, wherein the at least one processor is further programmed to derive, from each of the machine data sets of the rotary machines associated with the first set of the components, at least one of a geographic region in which the rotary machine is located, an altitude at which the rotary machine is located, an ambient condition profile for the site of the rotary machine, an owner/operator of the rotary machine, a source of fuel for the rotary machine, a proximity of the rotary machine to a body of salt water, a proximity of the rotary machine to a body of fresh water, and a proximity of the rotary machine to potential sources of air pollutants.

12. The imaging and analysis computing system of claim 9, wherein the at least one processor is further programmed to identify each at least one common parameter as present in at least a threshold number of the machine data sets of the rotary machines associated with the first set of the components.

13. The imaging and analysis computing system of claim 9, wherein the at least one processor is further programmed to identify the second pre-identified condition as associated with at least a threshold number of the second set of components.

14. The imaging and analysis computing system of claim 9, wherein the at least one processor is further programmed to store the at least one common parameter as one of a plurality of profile templates.

15. The imaging and analysis computing system of claim 14, wherein the at least one processor is further programmed to:
associate an examined component with at least one of the pre-identified conditions in the component database;
determine that the machine data set of the one of the rotary machines associated with the examined component matches at least one of the plurality of profile templates; and
report the at least one matched profile template as the potential cause of the at least one pre-identified condition.

16. The imaging and analysis computing system of claim 9, wherein the at least one processor is further programmed to:
identify, in the components database, a third set of components that includes each component in the second set of components that is of a same type as the first set of the components and is not associated with the first pre-identified condition in the component database;
identify, in the components database, at least one additional common parameter from the machine data sets of the rotary machines associated with the third set of components; and
report the at least one additional common parameter as a potential inhibitor of the first pre-identified condition.

17. At least one non-transitory computer-readable storage media having computer-executable instructions embodied thereon, wherein when executed by at least one processor, at least one processor communicatively coupled to at least one memory device, wherein a component database is stored in the at least one memory device, wherein each of a plurality of components is associated in the component database with one of a plurality of rotary machines and at least one of a plurality of pre-identified conditions, and wherein the computer-executable instructions cause the at least one processor to:
receive, for each of a plurality of rotary machines, a respective machine data set including recorded historical operational sensor and control data, a characteristic affecting load recorded during operation, and geographical site data for the associated rotary machine;
receive an indication of a removal of at least some of the components from a respective rotary machine of the plurality of rotary machines;
determine, for each of the removed components via image data of the components obtained after removal of the components from the rotary machines, at least one of the pre-identified conditions, wherein each of the pre-identified conditions includes a location and component wear or damage including at least one of cracking, pitting, and erosion, and wherein the location includes at least one of an airfoil root, an airfoil midsection, an airfoil tip, an airfoil leading edge, an airfoil trailing edge, a suction side, a pressure side, a shroud plate, and a shroud rail;
associate, in a component database, each of the components with the corresponding identified at least one pre-identified condition and the respective one of the rotary machines from which the component was removed
identify, in the component database, a first set of the components each having a first of the pre-identified conditions;
identify at least one common parameter from among machine data sets of the rotary machines associated with the first set of the components, wherein the at least one common parameter is at least one of the characteristic affecting load recorded during operation, and the geographical site data of the rotary machines;
store the at least one common parameter as a new profile template of a plurality of profile templates, the profile templates each including at least one parameter derivable from the machine data set that has been determined to be of interest in relation to determining causes of pre-identified conditions occurring in components of the plurality of rotary machines;
identify at least one of the rotary machines having a respective machine data set matching the new profile template;
identify, in the component database, a second set of the components associated with the at least one rotary machine, wherein a second of the pre-identified conditions is common to each of the components of the second set of the components; and
report the at least one common parameter as a potential cause of the first pre-identified condition, and as a potential cause of the second pre-identified condition associated with the second set of the components.

18. The computer-readable storage media of claim 17, wherein each of the machine data sets includes historical operational data for the associated rotary machine, and wherein the computer-executable instructions further cause the at least one processor to derive, from each of the machine data sets of the rotary machines associated with the first set of the components, at least one of a number of rotary machine start-ups, a number of accelerated rotary machine start-ups, a median time of day of rotary machine start-ups, a median duration of continuous operation of the rotary machine, a number of instances exceeding a threshold duration of continuous operation of the rotary machine, a number of hours of base load operation of the rotary machine, a number of hours of turndown operation of the rotary machine, a number of hours of peak firing of the rotary machine, a number of hours of operation of the rotary machine above a dynamic amplitude threshold, a maximum temperature of the rotary machine, a number of hours of operation of the rotary machine with low fuel pressure, a number of hours of daytime operation of the rotary machine, a number of hours of nighttime operation of the rotary machine, a number of hours of operation of the rotary machine during which an associated power grid exceeds a volatility threshold, and a number and a type of alarm events of the rotary machine.

19. The computer-readable storage media of claim 17, wherein each of the machine data sets includes geographical site data for the associated rotary machine, and wherein the computer-executable instructions further cause the at least one processor to derive, from each of the machine data sets of the rotary machines associated with the first set of the components, at least one of a geographic region in which the rotary machine is located, an altitude at which the rotary machine is located, an ambient condition profile for the site of the rotary machine, an owner/operator of the rotary machine, a source of fuel for the rotary machine, a proximity of the rotary machine to a body of salt water, a proximity of the rotary machine to a body of fresh water, and a proximity of the rotary machine to potential sources of air pollutants.

20. The computer-readable storage media of claim 17, wherein each of the machine data sets includes historical operational data for the associated rotary machine, and wherein the computer-executable instructions further cause the at least one processor to:

store the at least one common parameter as one of a plurality of profile templates;

associate an examined component with at least one of the pre-identified conditions in the component database;

determine that the machine data set of the one of the rotary machines associated with the examined component matches at least one of the plurality of profile templates; and report the at least one matched profile template as the potential cause of the at least one pre-identified condition;

associate an examined component with at least one of the pre-identified conditions in the component database;

determine that the machine data set of the one of the rotary machines associated with the examined component matches at least one of the plurality of profile templates; and report the at least one matched profile template as the potential cause of the at least one pre-identified condition.

* * * * *